US012057079B2

(12) United States Patent
Hsiao et al.

(10) Patent No.: US 12,057,079 B2
(45) Date of Patent: Aug. 6, 2024

(54) DISPLAY DEVICE

(71) Applicant: AmTRAN Technology Co., Ltd., New Taipei (TW)

(72) Inventors: Cheng-En Hsiao, New Taipei (TW); Chia-Wei Lin, New Taipei (TW); Che-Chia Ho, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 18/156,393

(22) Filed: Jan. 19, 2023

(65) Prior Publication Data

US 2023/0237969 A1 Jul. 27, 2023

(30) Foreign Application Priority Data

Jan. 27, 2022 (TW) ................................ 111103780

(51) Int. Cl.
*G09G 3/34* (2006.01)

(52) U.S. Cl.
CPC ... *G09G 3/3413* (2013.01); *G09G 2320/0247* (2013.01); *G09G 2320/0646* (2013.01)

(58) Field of Classification Search
CPC ........................ G06F 3/04886; G09G 2340/04
See application file for complete search history.

(56) References Cited

U.S. PATENT DOCUMENTS

| | | | | |
|---|---|---|---|---|
| 8,872,753 | B2 | 10/2014 | Glen | |
| 11,030,960 | B2 | 6/2021 | Morein | |
| 2007/0008338 | A1* | 1/2007 | Kim | G09G 5/006 345/629 |
| 2008/0191634 | A1* | 8/2008 | Jeong | H05B 41/2858 315/209 R |
| 2011/0032267 | A1* | 2/2011 | Chen | G09G 3/3426 345/589 |
| 2013/0239063 | A1* | 9/2013 | Ubillos | G06F 3/0485 715/838 |
| 2017/0347113 | A1 | 11/2017 | De Haan | |
| 2021/0375218 | A1 | 12/2021 | Li et al. | |
| 2022/0011628 | A1* | 1/2022 | Su | G09G 3/3413 |

FOREIGN PATENT DOCUMENTS

| | | | |
|---|---|---|---|
| CN | 1263294 | C | 7/2006 |
| CN | 1874447 | A | 12/2006 |
| CN | 102087836 | A | 6/2011 |
| CN | 112020169 | A | 12/2020 |
| CN | 112689107 | A | 4/2021 |
| CN | 113257197 | A | 8/2021 |
| TW | 201618073 | A | 5/2016 |

* cited by examiner

*Primary Examiner* — Nan-Ying Yang
(74) *Attorney, Agent, or Firm* — CKC & Partners Co., LLC

(57) ABSTRACT

A display device is disclosed. The display device includes a display panel, a backlight module, and a processor. The display panel displays a display screen. The backlight module provides a backlight brightness to the display panel. The processor generates the display screen and determines the backlight brightness corresponding to the display screen. The processor dynamically adjusts a size and a position of several display areas on the display screen based on an instant state of the continuous image signal respectively. The processor determines several backlight areas corresponding to several display areas respectively, and the processor generates several backlight control signals corresponding to several backlight areas respectively based on the display setting and several image contents.

17 Claims, 8 Drawing Sheets

700

DISPLAY DEVICE

CROSS REFERENCE TO RELATED APPLICATION

This application claims priority to Taiwan Application Serial Number 111103780, filed Jan. 27, 2022, which is herein incorporated by reference in its entirety.

BACKGROUND

Technical Field

The present disclosure relates to a display device, and more particularly, a display device with backlight adjustment.

Description of Related Art

Generally a user works with only one display monitor at one time. When the user wants to watch two pictures from two signal sources on one display monitor at the same time, he/she must enable the picture-in-picture (PIP) mode function of the display monitor, which divides the display screen into two sub-screen areas to display two pictures of two the signal sources respectively. However, when the signal sources is no longer operated by the user for a while and enters into the idle state, the sub-screen area corresponding to this signal source will still occupy part of the display screen and displays an idling screen, which affects the user's viewing and operating experience. In addition, if the user manually closes the sub-screen of the idling signal source or disables the PIP mode, he/she cannot receive any instant state changes or new information which wakes the signal source from the idle state. The user cannot acknowledge the state changes or information from the signal source until he/she enables the PIP mode of the display monitor again. Thus, the user may miss important any instant messages from the signal source. In addition, the display monitors usually provides user setting options of unified display settings for any screen areas on the display screen. When the user enables the PIP mode, the same set of display settings is applied to all PIP sub-screen areas. It is not possible to appropriately apply different display screen settings to the PIP sub-screen areas respectively based on the applications or images of the signal sources. Therefore, the PIP mode of the prior art display monitors cannot provide a good user experience.

SUMMARY

The summary aims at providing a simplified summary of the present disclosure, so that the reader has a basic understanding of the present disclosure. This summary is not a complete overview of the disclosure, and it is not intended to point out important/critical elements of embodiments of the present disclosure or define the scope of the present disclosure.

An aspect of the present disclosure is to provide a display device. The display device includes a display panel, a backlight module, and a processor. The display panel is configured to display a display screen. The backlight module is configured to provide a backlight brightness to the display panel. The processor is coupled to the display panel and the backlight module, configured to generate the display screen and to determine the backlight brightness corresponding to the display screen. The processor receives or generates several image contents according to a continuous image signal, the processor generates several display areas on the display screen displaying several image contents respectively based on a display setting, and the processor dynamically adjusts a size and a position of several display areas on the display screen based on an instant state of the continuous image signal respectively. The processor determines several backlight areas corresponding to several display areas respectively, and the processor generates several backlight control signals corresponding to several backlight areas respectively based on the display setting and several image contents.

Another aspect of the present disclosure is to provide a display device. The display panel is configured to display a display screen. The backlight module is configured to provide a backlight brightness to the display panel. The backlight module includes several backlight elements, several backlight elements respectively receive several backlight control signals of different types to generate brightness. The processor is coupled to the display panel and the backlight module, and the processor is configured to generate the display screen and to determine the backlight brightness corresponding to the display screen. The processor is further configured to dynamically generate several display areas of the display screen according to a display setting, and to determine several backlight areas of several display areas corresponding to the backlight module, and several display areas respectively display several image content. Several image contents are different. The processor is further configured to dynamically adjust a size and a position of several display areas respectively based on an instant state of a continuous image signal, and to generate several backlight control signals corresponding to several backlight areas. According to several display function settings corresponding to several display areas, several backlight control signals control several backlight areas to switch several dimming modes of several backlight areas.

Another aspect of the present disclosure is to provide a display device. The display device includes a display panel, a backlight module and a processor. The display panel is configured to display a display screen. The backlight module is configured to provide a backlight brightness to the display panel. The processor is coupled to the display panel and the backlight module, and the processor is configured to generate the display screen and to determine the backlight brightness corresponding to the display screen. The processor is further configured to receive a continuous image signal, and to instantly determine an instant state of the continuous image signal, the processor determines an operation state of the continuous image signal according to the instant state of the continuous image signal, when the operation state is not an idle state, the processor dynamically generates a display area on the display screen to display a first image content of the continuous image signal and adjusts a size and a position of the display area based on the instant state of the continuous image signal, the processor determines a backlight area of the backlight module corresponding to the display area according to the display area, and the processor generates a backlight control signal corresponding to the backlight area according to the first image content.

BRIEF DESCRIPTION OF THE DRAWINGS

The present disclosure can be more fully understood by reading the following detailed description of the embodiment, with reference made to the accompanying drawings as follows.

DETAILED DESCRIPTION

The term "coupled" as used herein may also refer to "electrically coupled", and the term "connected" may also refer to "electrically connected". "Coupled" and "connected" may also refer to two or more elements cooperating or interacting with each other.

Figure 1:
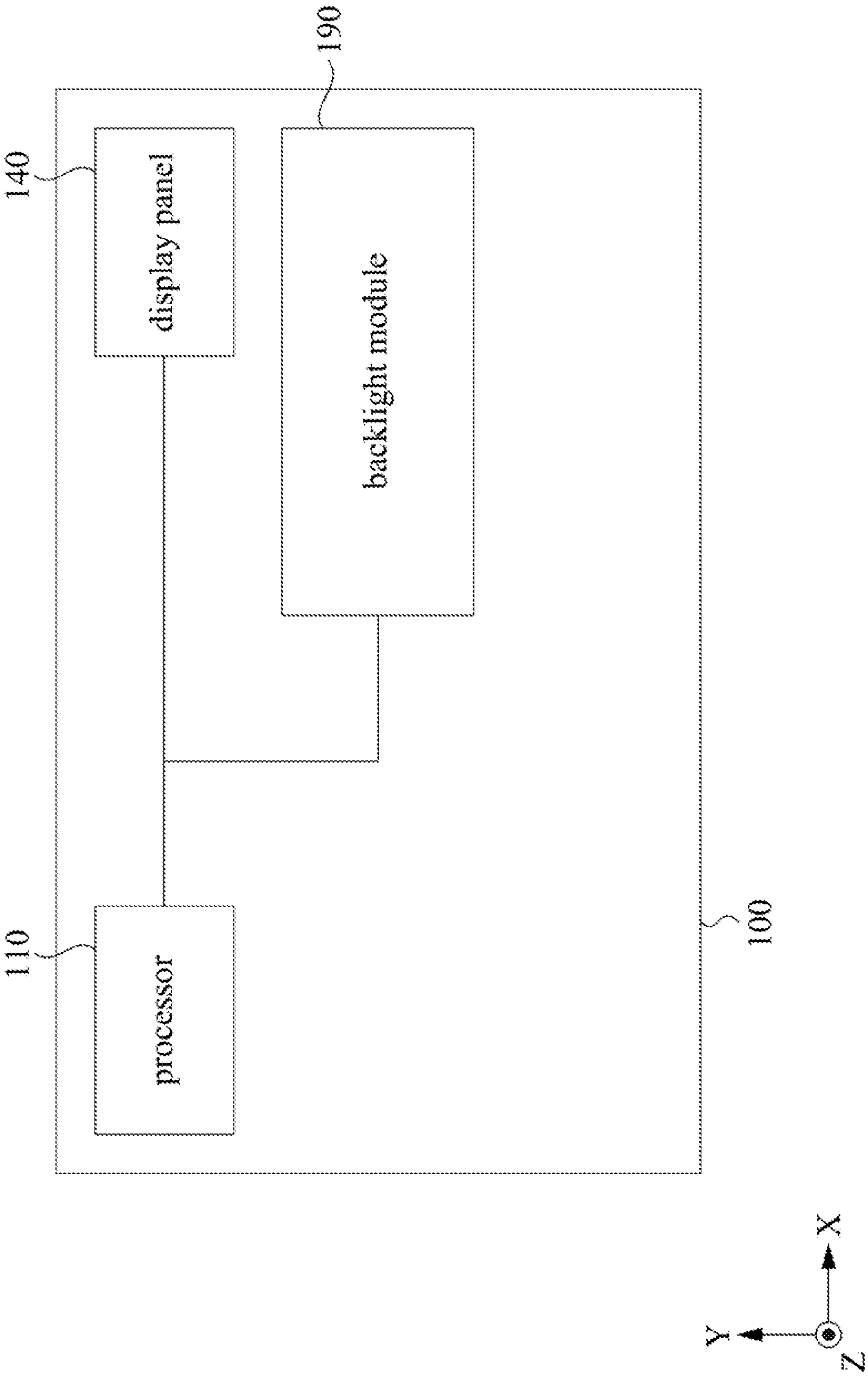
FIG. 1 is a schematic diagram of a display device according to some embodiments of the present disclosure.

Reference is made to FIG. 1. FIG. 1 is a block diagram of a display device 100 according to some embodiments of the present disclosure.

Taking FIG. 1 as an example. The display device 100 includes a processor 110, a display panel 140 and a backlight module 190. The processor 110, the display panel 140 and the backlight module 190 are coupled to each other in a connection relationship. In some embodiments, the backlight module 190 includes the LED driving circuit 150 and the LED backlight unit 160. In some embodiments, the display panel 140 can be divided into multiple display areas respectively corresponding to multiple backlight areas formed by the LED backlight unit 160. Each backlight area is mapped to a single or several LED backlight units 160, which respectively illuminate the corresponding display areas.

Figure 2:
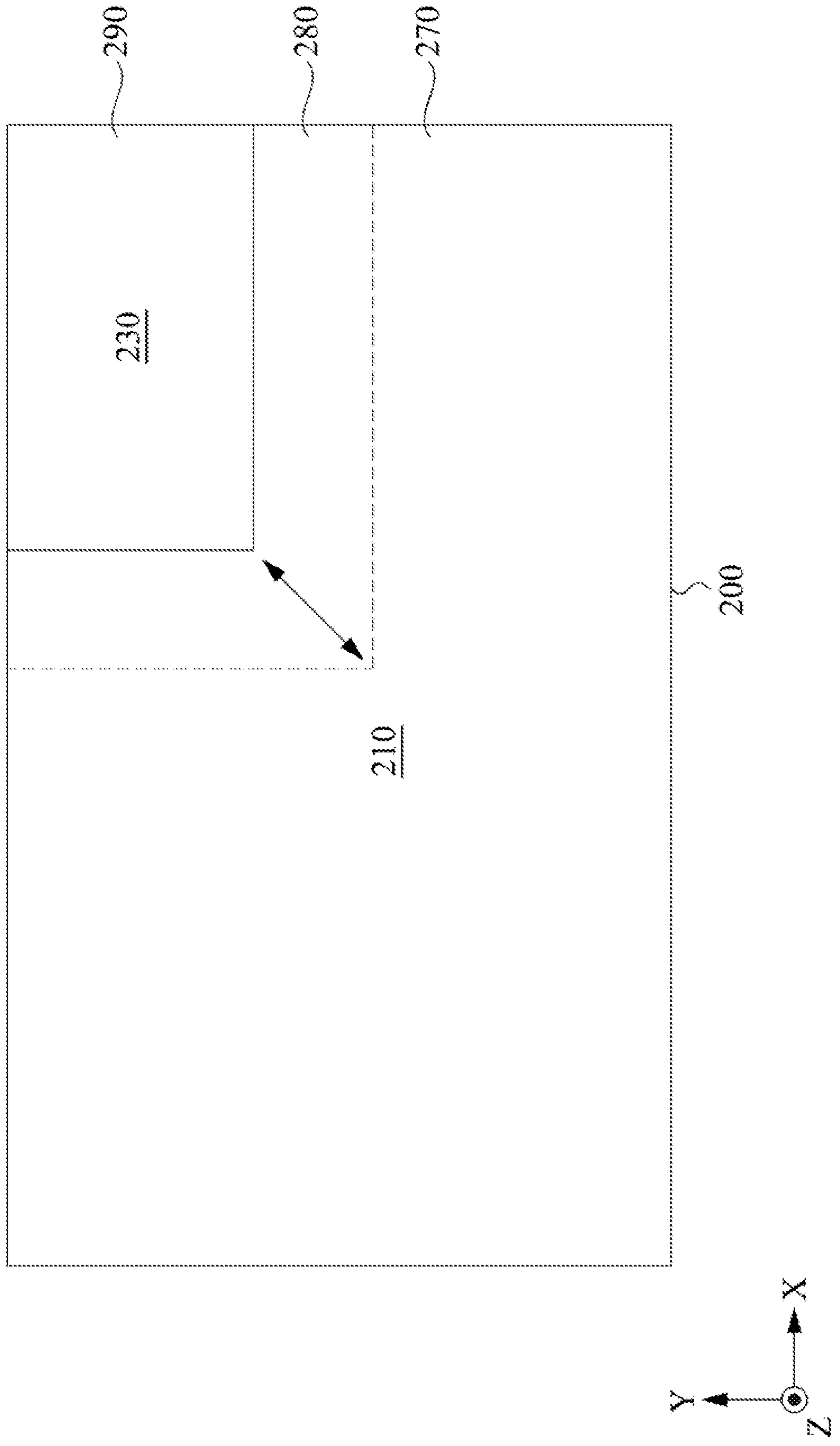
FIG. 2 is a schematic diagram illustrating a display screen according to some embodiments of the present disclosure.

Reference is made to FIG. 2. FIG. 2 is a schematic diagram illustrating a display screen 200 according to some embodiments of the present disclosure. The display screen 200 is shown by the display panel 140 in FIG. 1. In some embodiments, the display screen 200 includes a main screen 210 and a sub-screen 230, which are displayed when the display device operates in a picture-in-picture (PIP) mode. The main screen 210 and the sub-screen 230 are different display areas. Generally speaking, the size of the main screen 210 is the size of the display screen 200, and the relative position and the size of the sub-screen 230 on the main screen 210 are adjusted according to the display settings or dynamically and automatically adjusted by the processor 110. In some embodiments, the display setting can be switched among various display modes of divided screen areas, such as a picture-by-picture mode (PBP) or other display modes with multiple divided areas of the display screen. In addition, each of the screen areas, including main screen or subscreens, has respective display settings, which can be manually configured by the user or configured automatically according to the image signals to be displayed in each of the screen areas, including local dimming, high dynamic area (HDR) or other display settings. In addition to the screen areas with fixed sizes, the processor 110 can automatically adjust the boundaries, positions, and display settings of various screen areas according to the image signals from corresponding signal sources and settings for automatic creating screen areas. The processor 110 also instantly corresponds the backlight areas to each of current screen areas.

Figure 3:
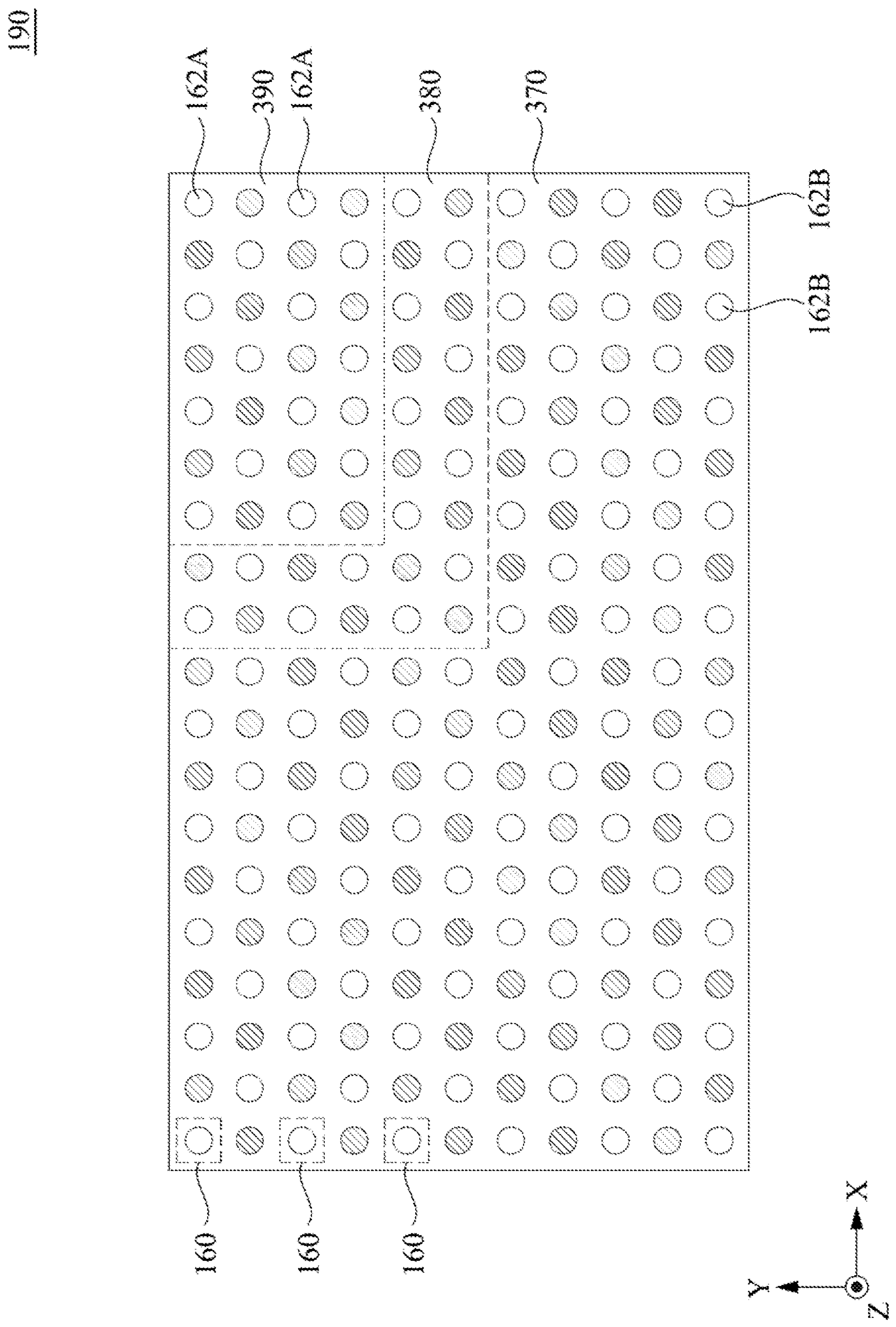
FIG. 3 is a schematic diagram illustrating the backlight module according to some embodiments of the present disclosure.

Reference is made to FIG. 3. FIG. 3 is a schematic diagram illustrating the backlight module 190 according to some embodiments of the present disclosure. The backlight module 190 is configured to provide backlight brightness to the display panel 140. As shown in FIG. 3, in some embodiments, the backlight module 190 includes several LED backlight units 160.

Reference is made to FIG. 1 again. In some embodiments, the processor 110 is configured to receive the input signals and determines the output light brightness of each LED backlight unit 160 according to the input signal. Accordingly, the processor 110 outputs the backlight control signal to the LED driving circuit 150. In some embodiments, the input signals include image contents to be displayed. In some embodiments, the processor 110 is configured to receive or generate the image contents based on the input signals.

The above-mentioned configurations of the display device 100 are for illustrative purposes only, and various configurations of the display device 100 are within the scope of the present disclosure. The detailed operations of the display device 100 will be described below along with the flowcharts in FIG. 4 to FIG. 7.

Figure 4:
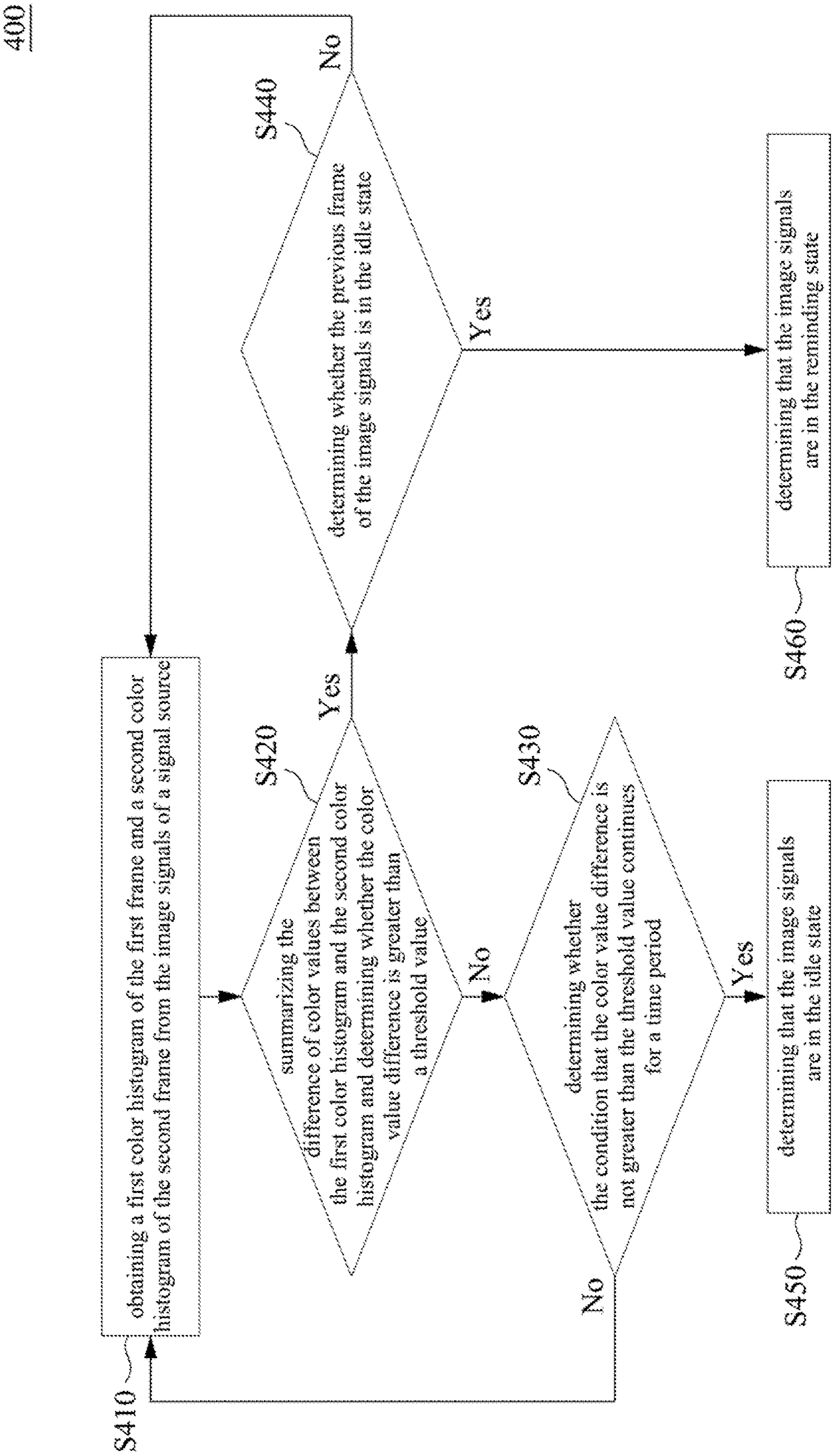
FIG. 4 is a flowchart illustrating a method for determining the state of a sub-screen according to some embodiments of the present disclosure.

Reference is made to FIG. 4. FIG. 4 is a flowchart illustrating a process 400 for determining the image state of a sub-screen according to some embodiments of the present disclosure. The image state determination process 400 for a sub-screen can be applied to the display device 100 as shown in FIG. 1. The display device 100 executes the method simultaneously for all the received input image signals to be displayed in sub-screens, and the display device 100 continuously processes each image frame of the input image signals. Reference is made to FIG. 1 and FIG. 4 together.

In operation S410, a first color histogram of the first frame and a second color histogram of the second frame are obtained from the image signals of a signal source. The image signals of a signal source can be the image of an on-screen display function menu or the operating system of a computer connected to the display device. The image signals can also be provided by various image signal sources, such as TV channels, peripheral devices, for example, DVD players, game instruments, or mobile devices, and network connected sources, for example, streaming media webpages or applications, video conferencing applications, instantly messages, emails, etc. In some embodiments, operation S410 is performed by the processor 110 within the display device of FIG. 1. In some embodiments, the image signals are input signals to be displayed in a sub-screen 230 in FIG. 2 including a first image frame and a second image frame, wherein the first image frame and the second image frame are two consecutive image frames. When the display device receives one of the image frames from of the image signals, the processor 110 automatically converts or calculates the color histogram of the received image frame and stores the obtained color histogram for future use.

In operation S420, the difference of color values between the first color histogram and the second color histogram is summarized and determined whether the color value difference is greater than a threshold value. In some embodiments, the processor 110 in FIG. 1 calculates the color value difference between the first color histogram and the second color histogram and determines whether the color value difference is greater than the threshold value. If the color value difference is determined as greater than the threshold value in operation S420, operation S440 is performed next. If the color value difference is determined as not greater than the threshold value in operation S420, operation S430 is performed next.

In operation S430, it is determined whether the condition that the color value difference is not greater than the threshold value continues for a time period. In some embodiments, operation S430 is performed by the processor 110 in FIG. 1. If the operation S430 determines that the color value differences of color histograms are continuously not greater than the threshold value in the time period, such as, a preset time value between tens of seconds and several minutes, the operation S450 is performed next. If operation S430 determines that the color value differences fails to be continuously not greater than the threshold value in the time period, the image state determination process 400 returns to the operation S410 and start again to obtain the third color histogram of the third frame of the sub-screen 230 in FIG. 2. The third frame picture and the second frame picture are two consecutive pictures. In the newly started operation S410, the first color histogram is the second color histogram of the previous operation S410, and the new second color histogram is the third color histogram, and so on.

In operation S440, it is determined whether the previous frame of the image signals is in the idle state. In some embodiments, the operation S440 is performed by the processor 110 in FIG. 1. The operations S430 and S450 in the image state determination process 400 executed last time determine whether the previous frame is in the idle state, and the operation S440 of the image state determination process 400 executed currently reads the determination result of the previous frame from the operations of the image state determination process 400 executed last time. If the operation S440 determines that the previous frame is in the idle state, the operation S460 is performed next. If the operation S440 determines that the previous frame is not in the idle state, the image state determination process 400 returns to the operation S410 and start again to obtain the third color histogram of the third frame of the sub-screen 230 in FIG. 2. The third frame picture and the second frame picture are two consecutive frames, and then the image state determination process 400 restarts from the operation S410 as described above, so the previously described embodiment will not be repeated herein.

In operation S450, it is determined that the image signals are in the idle state, which means that the image signals for a sub-screen are not sufficiently changed after the certain time period has elapsed. The area of the sub-screen displaying the image signals on the display screen can be reduced, the screen coverage priority can be reduced, or the sub-screen area can be moved to a nonobvious position on the display screen, etc. In some embodiments, the operation S450 is performed by the processor 110 in FIG. 1, and then the image state determination process 400 restarts from the operation S410 as described above.

In operation S460, it is determined that the image signals are in the reminding state, which means that that the image signals for a sub-screen have new changes from the idle state and it is necessary to remind the user instantly of this new situation. In some embodiments, the operation S460 is performed by the processor 110 in FIG. 1, and then the image state determination process 400 restarts from the operation S410 as described above.

Figure 5:
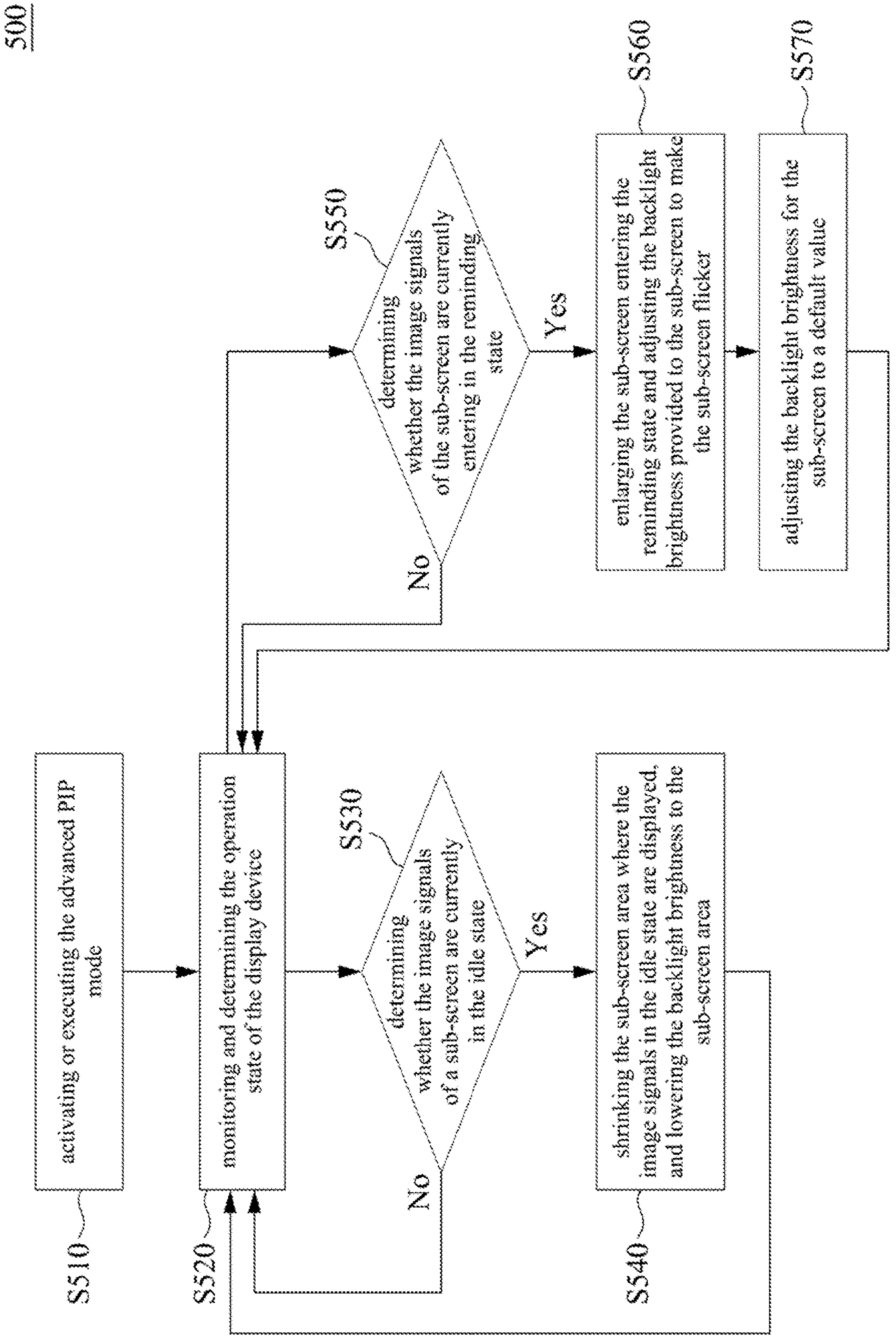
FIG. 5 is a flowchart illustrating a backlight adjustment method according to some embodiments of the present disclosure.

Reference is made to FIG. 5. FIG. 5 is a flowchart illustrating a backlight adjustment process 500 according to some embodiments of the present disclosure. The backlight adjustment process 500 can be applied to the display device 100 as shown in FIG. 1, which instantly receives the processed results of the image signals, corresponding to each sub-screen respectively, processed by the image state determination process 400. Reference is made to FIG. 1 and FIG. 5 together.

In operation S510, the display device 100 activates or executes the advanced PIP mode. In some embodiments, operation S510 is performed by the processor 110 in FIG. 1. In some embodiments, the user sets the advanced PIP mode through a remote controller (not shown), and the remote controller transmits the input signals to the processor 110 according to the setting made by the user. After receiving the input signal, the processor 110 activates the advanced PIP mode of the display device 100 illustrated in FIG. 1, and the display device 100 continuously and repeatedly executes the backlight adjustment process 500 when the advanced PIP mode is activated.

In operation S520, the operation state of the display device is monitored and determined. In some embodiments, operation S520 is performed by the processor 110 in FIG. 1. In some embodiments, the processor 110 monitors and determines the operation state of each sub-screen respectively according to the image state determination process 400 in FIG. 4 executed on the received image signals.

In operation S530, it is determined whether the image signals of a sub-screen are currently in the idle state. In some embodiments, operation S530 is performed by the processor 110 in FIG. 1. If the operation S530 determines that the image signals of a sub-screen are currently in the idle state, operation S540 is performed next. If the operation S530 determines that the image signals currently are not in the idle state, the backlight adjustment process 500 returns to the operation S520.

In operation S540, the display device shrinks the sub-screen area where the image signals in the idle state are displayed, and the backlight brightness to the sub-screen area is lowered. In some embodiments, the operation S540 is performed by the processor 110 in FIG. 1. Reference is made to FIG. 2. In some embodiments, the processor 110 shrinks the area of the sub-screen 230, which changes the ratio of the area of the sub-screen 230 (the sub-screen area) to the area of the main screen 210 (the main screen area) as shown in FIG. 2. For example, the sub-screen 230 is shrinked from the area 280 to the area 290, but the embodiments of the present disclosure are not limited thereto. The number, areas, and positions of the sub-screens on the display screen are not limited to the embodiments shown as the sub-screen 230 in FIG. 2, and the changes made to the sub-screen 230 may also include reducing the coverage priority on the display screen or moving the sub-screen area to a more nonobvious position. For example, another sub-screen or main screen may cover on the sub-screen 230 which makes the sub-screen area partially or completely disappear, or the sub-screen area is moved to a corner position. In some embodiments, multiple sub-screens with different area sizes can exist on the display screen at the same time, and the display device can simultaneously display multiple sub-screens on the display screen without a main screen. The respective area sizes, positions and brightness values of the displayed sub-screens can be dynamically adjusted by the processor 110. For example, when there are multiple sub-screens on the display screen, the processor 110 may select some of the sub-screens to be covered by one other or others and not displayed according to the respective operation state of image signals for the sub-screens. The processor 110 may also select some of the sub-screens to be displayed side by side and adjust their area sizes to fit the display screen. The sizes and shapes of the displayed sub-screens can be equal, similar, or different, which can be dynamically determined and adjusted by the processor 110.

Reference is made together to FIG. 3. The backlight area 380 in FIG. 3 is corresponding to the sub-screen area 280 of the sub-screen 230 in FIG. 2, and the backlight area 390 is corresponding to the sub-screen area 290 of the sub-screen 230 in FIG. 2, i.e., the backlight area 390 in FIG. 3 is overlapped in the Z direction by the sub-screen area 290 of the sub-screen 230 in FIG. 2. The backlight area 380 and the backlight area 390 respectively include multiple sub-backlight units 162A in the LED backlight unit 160. In the operation S540, after shrinking the area of the sub-screen 230, the processor 110 determines the corresponding backlight area 390 according to the shrunk sub-screen area. The processor 110 also reduces the backlight brightness of certain sub-backlight units 162A located in the corresponding backlight area 390, so that the brightness of the sub-screen in the idle state is reduced and the sub-screen area is dimmed. As mentioned above, the processor 110 can dynamically adjust the respective area, shape or position of each sub-screen, and the processor 110 determines the backlight area corresponding to each displayed sub-screen after adjustments are made, so that the backlight areas respectively generate the brightness required for the corresponding sub-screens.

In operation S550, it is determined whether the image signals of the sub-screen are currently entering in the reminding state. In some embodiments, the operation S550 is performed by the processor 110 in FIG. 1. If it is determined in the operation S550 that image signals of the sub-screen are currently entering the reminding state from the idle state, the operation S560 is executed next. If it is determined in the operation S550 that the image signals of the sub-screen are not currently in the reminding state, the backlight adjustment process 500 returns to the operation S520.

In operation S560, the sub-screen entering the reminding state is enlarged and the backlight brightness provided to the sub-screen is adjusted to make the sub-screen flicker. Reference is made together to FIG. 2. In some embodiments, the processor 110 enlarges the area of the sub-screen 230, which changes the ratio of the area of the sub-screen 230 (the sub-screen area) to the area of the main screen 210 (the main screen area) as shown in FIG. 2. For example, the sub-screen 230 is enlarged from the sub-screen area 290 to the sub-screen area 280, but the embodiments of the present disclosure are not limited thereto. The number, areas, and positions of the sub-screens on the display screen are not limited to the embodiments shown as the sub-screen 230 in FIG. 2, and the changes made to the sub-screen 230 may also include increasing the coverage priority on the display screen or moving the sub-screen area to a more obvious position, etc. For example, the sub-screen area may cover part or all of another sub-screen or the main screen, or the sub-screen area may be moved closer to the center of the display screen. As mentioned above, in some embodiments, multiple sub-screens with different area sizes can exist on the display screen at the same time, and the display device screen can simultaneously display multiple sub-screens on the display screen without a main screen. The respective area sizes, positions and brightness values of the displayed sub-screens can be dynamically adjusted by the processor 110. For example, when there are multiple sub-screens on the display screen, the processor 110 may select some of the sub-screens to be covered by one other or others and not displayed according to the respective operation state of image signals for the sub-screens. The processor 110 may also select some of the sub-screens to be displayed side by side and adjust their area sizes to fit the display screen. The sizes and shapes of the displayed sub-screens can be equal, similar, or different, which can be dynamically determined and adjusted by the processor 110.

Reference is made together to FIG. 3. The backlight area 380 in FIG. 3 is corresponding to the sub-screen area 280 of the sub-screen 230 in FIG. 2, and the backlight area 390 is corresponding to the sub-screen area 290 of the sub-screen 230 in FIG. 2, i.e., the backlight area 380 in FIG. 3 is overlapped in the Z direction by the sub-screen area 280 of the sub-screen 230 in FIG. 2. The backlight area 380 and the backlight area 390 respectively include multiple sub-backlight units 162A in the LED backlight unit 160. In the operation S560, the processor 110 enlarges the area of the sub-screen 230 and determines the corresponding backlight area 380 according to the enlarged sub-screen area. The processor 110 also increases the backlight brightness of the certain sub-backlight units 162A located in the corresponding backlight area 380, so that the brightness of sub-screen area in the reminding state is increased. In some embodiments, the processor 110 further makes the sub-backlight units 162A in the backlight area 380 to flicker in brightness for a period of time that the brightness varies within the sub-backlight units' light-emitting brightness range. For example, in some embodiments, the processor 110 drives the sub-backlight units 162A to flicker between 10% and 80% brightness for 5 seconds in order to remind and attract the user's attention to the sub-screen area corresponding to the backlight area 380. The above-mentioned time interval and percentages of the sub-backlight brightness are only used for illustration, and the processor 110 may cause the sub-backlight area corresponding to a part of the sub-screen area to flicker. For example, only the borders, corners, interiors or the center of the sub-screen area flickers in brightness. Instead, the processor 110 may increase the light-emitting brightness of the sub-screen area without flickering, or the processor 110 may just restore the brightness of the sub-screen area to a default value.

In operation S570, the backlight brightness for the sub-screen is adjusted to a default value. In some embodiments, the operation S570 is performed by processor 110 in FIG. 1. For example, after making the sub-backlight units 162A in FIG. 3 flicker in brightness for a certain period of time or reminding the user in other ways, the processor 110 adjusts the backlight brightness provided by the sub-backlight units 162A to the default value, so that the corresponding image signals can be displayed normally in the sub-screen area. In some embodiments, the default value is set by the user via a remote control or other device, which is processed accordingly by the processor 110 in FIG. 1. In some embodiments, the processor 110 adjusts the areas and positions of all the sub-screens at the same time when any of the sub-screens enter the reminding state. The adjustments may include closing any of the sub-screens, generating a new sub-screen area, dynamically adjusting the respective area sizes and positions of the sub-screens, and determining the sub-backlight area corresponding to each of the sub-screens on the display screen. For example, a sub-screen entering the reminding state appears which was hidden from the display screen, the sub-screen entering the reminding state is enlarged in advance, or the sub-screen entering reminding state is moved to a more obvious position, so that other sub-screens or the main screen are partially covered or completely covered by this sub-screen. After the reminding period passes, the processor 110 restore the area size and position of the sub-screen leaving the reminding state, such as displaying this sub-screen side by side with other sub-screens, or displaying this sub-screen with the standard area and position in the PIP mode. The processor 110 will simultaneously determine respective the sub-backlight areas corresponding to all the sub-screens and/or the main screen on the display screen, in order to respectively generate the required brightness for the sub-screens.

Figure 6:
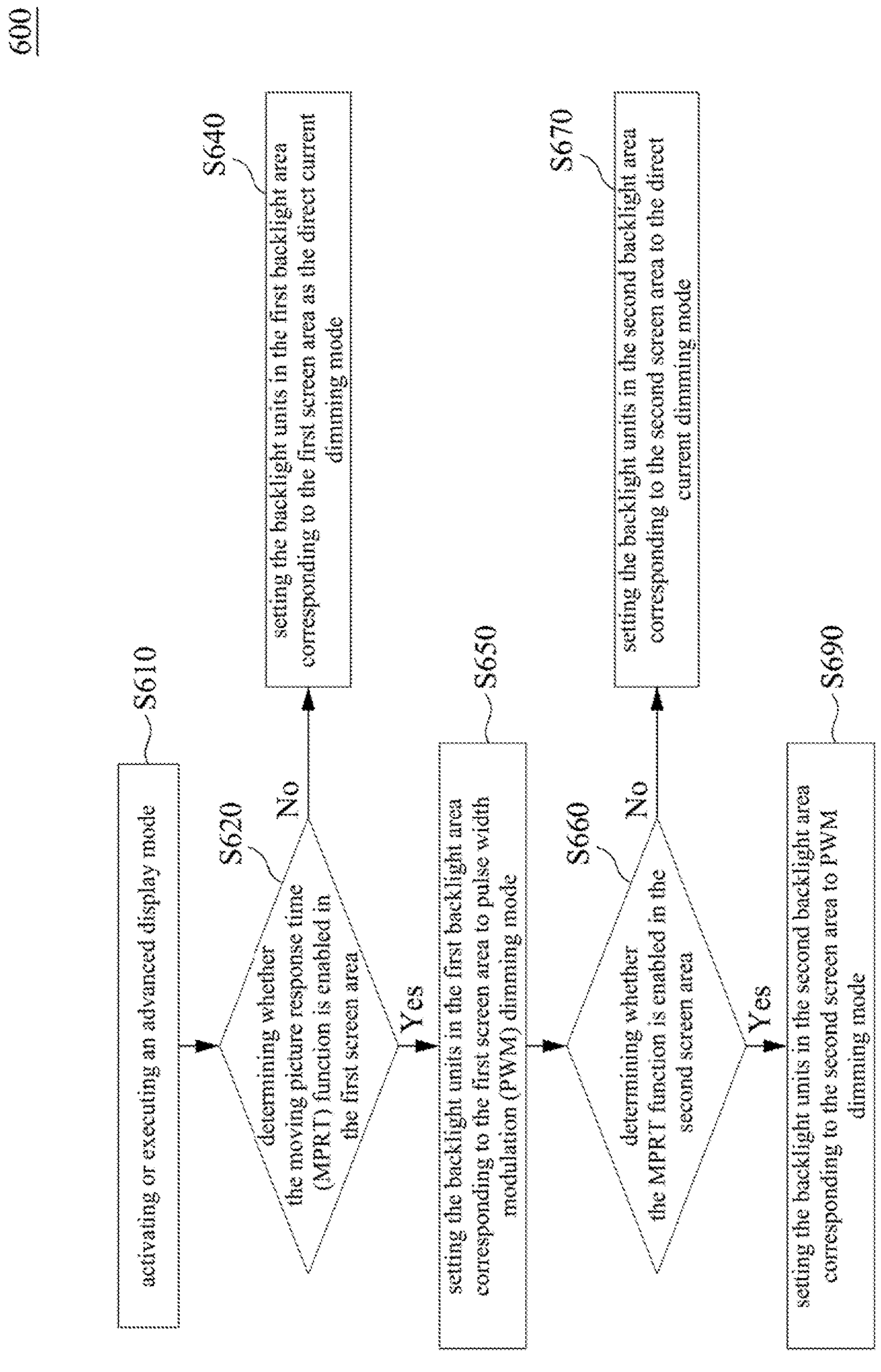
FIG. 6 is a flowchart of illustrating advanced backlight adjustment method according to some embodiments of the present disclosure.

Reference is made to FIG. 6. FIG. 6 is a flowchart of illustrating advanced backlight control process 600 according to some embodiments of the present disclosure. The advanced backlight control process 600 can be applied to the display device 100 as shown in FIG. 1, and the backlight module can be controlled according to the respective display settings of each sub-screen and/or the main screen on the display screen in order to provide the brightness required for displaying respective image signals. Reference is made to FIG. 1 and FIG. 6 together, which will be described below.

In operation S610, the display device 100 activates or executes an advanced display mode. In some embodiments, the operation S610 is performed by the processor 110 in FIG. 1. In some embodiments, the processor 110 activates the advanced display mode of the display device 100 in FIG. 1 according to the input signal, and the display device 100 continuously and repeatedly executes the advanced backlight control process 600 during the advanced display mode.

In operation S620, it is determined whether the moving picture response time (MPRT) function is enabled in the first screen area. In some embodiments, the user can set the display settings of various functions, including display function settings (e.g., MPRT setting), on the display device 100 in FIG. 1 through the remote controller (not shown), and the display setting includes respective settings corresponding to each of the screen areas, such as the sub-screens and main screen. In some embodiments, the first screen area is the main screen, and the display device 100 pre-stores the first display settings applicable to the first screen area. The first display settings include the setting of whether the MPRT function is enabled in the first screen area, and the user can operates to input adjustments for the setting.

In the operation S620, the first backlight area corresponding to the first screen area is also determined. Reference is made to FIG. 2 and FIG. 3 together. For example, the first screen area is the main screen. In FIG. 2, if the sub-screen 230 is located in the sub-screen area 290, the main screen 210 is located in the main screen area 270, which is the area of the display screen 200 (the display screen area) excluding the sub-screen area 290 in FIG. 2. The processor 110 in FIG. 1 determines that the backlight area 370 corresponding to the main screen area 270 in FIG. 3 is the first backlight area associated to the first screen area according to the main screen area 270. As mentioned above, besides the main screen, multiple sub-screens with different area sizes can exist on the display screen at the same time, and the respective area sizes, positions and brightness of the sub-screens can be dynamically adjusted by the processor 110. The processor 110 dynamically determines the corresponding backlight areas according to the screen areas of the sub-screens and main screen in real-time, so as to control the backlight units to respectively provide the required brightness to the corresponding sub-screens or main screen.

If the operation S620 determines that the MPRT function is enabled in the first display settings, operation S650 is executed next. If the operation S620 determines that the MPRT function is disabled in the first display settings, operation S640 is executed next.

In operation S640, the backlight units in the first backlight area corresponding to the first screen area are set as the direct current dimming mode. In some embodiments, the operation S640 is performed by the processor 110 in FIG. 1. In some embodiments, the processor 110 sets the backlight units in the first backlight area to direct current dimming mode based on the MPRT function being turned off or disabled in the first display settings. For example, the backlight units 162B of the backlight area 370 in FIG. 3 are set to be electrically driven to emit light by direct current signals, which control the brightness of the light emitted in the backlight area 370. In this case, all of the backlight units in the first backlight area corresponding to the first screen area are set to direct current dimming mode.

In operation S650, the backlight units in the first backlight area corresponding to the first screen area are set to pulse width modulation (PWM) dimming mode. In some embodiments, the operation S650 is performed by the processor 110 in FIG. 1. If it is determined in the operation S620 that the MPRT function of the first display setting is enabled or turned on, the processor 110 sets the dimming mode of the backlight units in the first backlight area to pulse width modulation (PWM) dimming. For example, the backlight units 162B of the backlight area 370 in FIG. 3 are set to be driven by PWM control signals, which control the brightness of the light emitted in the backlight area 370. In this case, all of the backlights unit in the first backlight area corresponding to the first screen area are set to PWM dimming mode.

In operation S660, it is determined whether the MPRT function is enabled in the second screen area. In some embodiments, the second screen area is the sub-screen 230 shown in FIG. 2, and the second display settings are applicable to the second screen area, including the setting to enable or disable MPRT function in the second screen area. The processor 110 determines whether to enable the MPRT function in the second screen area according to the second display settings.

In operation S660, the second backlight area corresponding to the second screen area is also determined. Reference is made to FIG. 2 and FIG. 3 together. For example, the second screen area is the sub-screen 230 in FIG. 2. Assuming that the sub-screen 230 occupies the sub-screen area 290 on the display screen, the processor 110 in FIG. 1 determines that the sub-screen area 290 is the second screen area and the backlight area 390 corresponding to the sub-screen area 290 is the second backlight area. As mentioned above, besides the main screen, multiple sub-screens with different area sizes can exist on the display screen at the same time, and the respective area sizes, positions and brightness of the sub-screens can be dynamically adjusted by the processor 110. The processor 110 dynamically determines the corresponding backlight areas according to the respective areas of the sub-screens and the main screen in real-time, so as to control the backlight units in the respective backlight areas to provide the required brightness to the corresponding sub-screens or main screen.

If the operation S660 determines that the MPRT function is enabled in the second screen area, operation S690 is performed next. If the operation S660 determines that the MPRT function is not enabled in the second screen area, operation S670 is performed next.

In operation S670, the backlight units in the second backlight area corresponding to the second screen area are set to the direct current dimming mode. In some embodiments, the operation S670 is performed by the processor 110 in FIG. 1. In some embodiments, the processor 110 sets sets the backlight units in the second backlight area to direct current dimming mode based on the MPRT function being turned off or disabled in the second display settings. For example, the backlight units 162A of the backlight area 380 or 390 in FIG. 3 are set to be electrically driven to emit light by direct current signals which control the brightness of the light emitted in the backlight area 380 or 390. If it is determined in the operation S660 that the MPRT function of the second display setting is disabled or turned off, all the backlight units in the second backlight area are set to direct current dimming mode according to the second display settings.

In operation S690, the backlight units in the second backlight area corresponding to the second screen area are set to PWM dimming mode. In some embodiments, the operation S690 is performed by the processor 110 in FIG. 1. If it is determined in the operation S660 that the MPRT function of the second display settings is enabled or turned on, the processor 110 sets the backlight units in the second backlight area to PWM dimming mode. For example, the backlight units 162A of the backlight area 380 or 390 in FIG. 3 are set to are set to be driven by PWM control signals, which control the brightness of the light emitted in the backlight area 380 or 390. In this case, all of the backlights unit in the second backlight area corresponding to the second screen area are set to PWM dimming mode.

According to the above disclosures, the main screen and the sub-screens in the embodiments of the present disclosure can be respectively applied with different display settings and backlight dimming methods. The various sub-screens can also be applied with different display settings and backlight dimming methods respectively. The processor can dynamically and automatically adjust the respective areas and positions of the main screen and the sub-screens, and the processor can also automatically apply the respective display settings and backlight dimming settings of the main screen and the sub-screens to the corresponding backlight areas in real time, so that the image signals with various contents can be displayed with best image qualities in their respective display screen areas.

Figure 7:
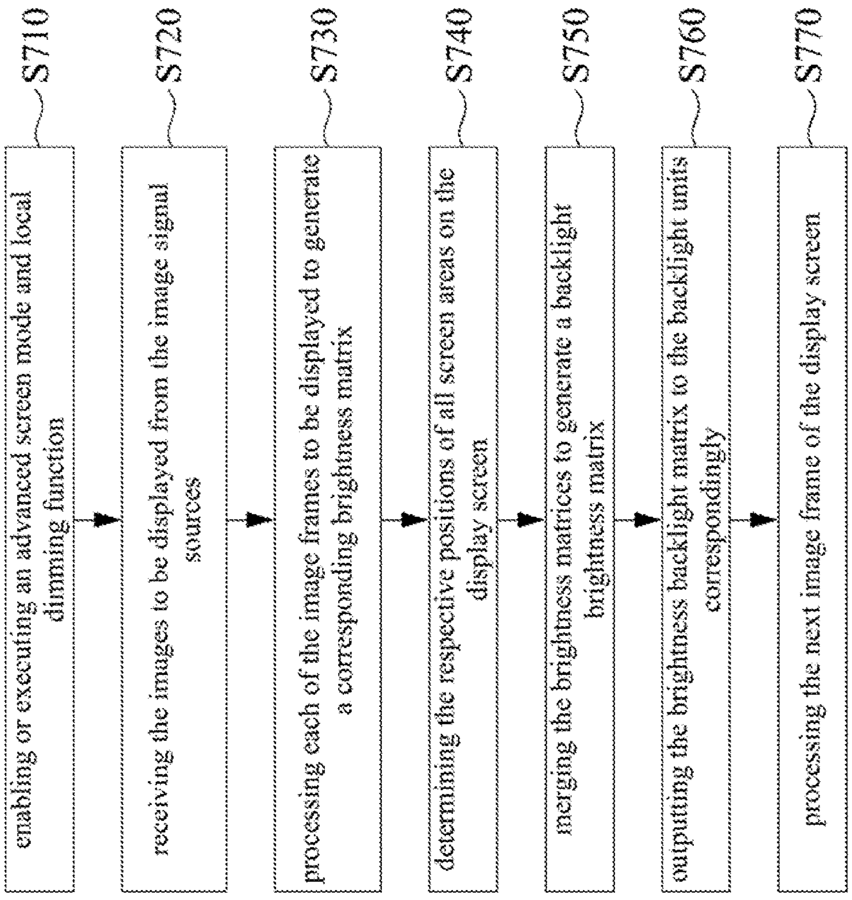
FIG. 7 is a flowchart illustrating a method for generating a backlight control signal according to some embodiments of the present disclosure.

Reference is made to FIG. 7. FIG. 7 is a flowchart illustrating a process 700 for generating a backlight control signal according to some embodiments of the present disclosure. The backlight control signal can be applied to the display device 100 as shown in FIG. 1. The backlight control signals are generated according to the results of the advanced backlight control process 600 to control each backlight unit in the backlight module to provide the respectively required brightness to each screen area. Reference is made to FIG. 1 and FIG. 7 together, which will be described below.

In operation S710, the display device 100 enables or executes an advanced screen mode and local dimming function. In some embodiments, the operation S710 is performed by the processor 110 in FIG. 1 according to the display settings. In some embodiments, the user can use the remote controller (not shown) to set the advanced screen mode of the display device 100 and to enable the local dimming function. After the processor 110 receives the input signal from the remote control, the advanced screen mode and the local dimming function of the display device 100 are activated, and the display device 100 will continue to repeatedly execute the backlight control signal generating process 700 when the advanced screen mode and the local dimming function are enabled.

In operation S720, the display device receives the images to be displayed from the image signal sources. In some embodiments, the operation S720 is performed by processor 110 in FIG. 1. In some embodiments, the processor 110 receives an image frame to be displayed at a time, which is part of the continuous pictures from one of the signal sources (not shown). The processor 110 may also receives compressed continuous image signals or streaming media signals from the signal sources. The processor 110 will process all the received signals to obtain the continuous images to be displayed, and then the processor 110 arranges each image frame or part of the continuous images in sequential order. Eventually all the image frames to be displayed at next time are processed in the next operation S730.

In operation S730, each of the image frames to be displayed is processed to generate a corresponding brightness matrix. In some embodiments, the operation S740 is performed by the processor 110 in FIG. 1. In the operation S720, an image frame is received from each image signal sources, and the processor 110 processes the image to be displayed to generate a brightness matrix of the image to be displayed. In some embodiments, the first screen area is a main screen, and the second screen area is a sub-screen. For example, the processor 110 in FIG. 1 generates a first brightness matrix according to the brightness values of the image frame to be displayed in the main screen area. The processor 110 generates a second brightness matrix according to the brightness values of the image frame to be displayed in the sub-screen area.

In operation S740, the respective positions of all screen areas on the display screen is determined. In some embodiments, the operation S740 is performed by the processor 110 in FIG. 1, and the processor 110 determines the respective position and area size of each screen area to be displayed on the display screen 200. In some embodiments, the first screen area is the main screen and the second screen area is the sub-screen. The processor 110 determines that the sub-screen 230 is located at the position of the sub-screen area 280 or 290 on the display screen 200, and the processor 110 determines that the main screen 210 is located at the position of the main screen area 270, which is the area of the display screen 200 (the display screen area) excluding the area of the sub-screen 230. The sub-screens can be at anywhere on the display screen, and the display screen is not limited to displaying one sub-screen or two screen areas at the same time. The exemplary embodiments shown in FIG. 2 are for illustration purposes only. In some embodiments, the respective position of each screen area is defined by the coordinates of the borders or corners of the screen areas. After determining the respective positions of each screen area on the display screen, the processor 110 adjusts the sizes of all image frames to be displayed at the same time to fit the corresponding screen areas respectively. The processor 110 combines the adjusted image frames into a frame of display screen, in which each adjusted image frame is displayed in the corresponding screen area at the same time.

In operation S750, the brightness matrices are merged to generate a backlight brightness matrix. In some embodiments, the operation S750 is performed by the processor 110 in FIG. 1. In some embodiments, the backlight brightness matrix is a main brightness matrix corresponding to the display screen. In some embodiments, the processor 110 merges the respective brightness matrices generated in the operation S730 according to the respective positions of the screen areas on the display screen, which are determined in the operation S740. In some embodiments, the processor 110 adjusts each brightness matrix to fit the respective area size of the corresponding screen area, and the processor 110 maps the adjusted brightness matrices to the adjusted screen areas correspondingly and combines them into the backlight brightness matrix of the display screen. In some embodiments, the first screen area is the main screen 210, the second screen area is the sub-screen 230. The sub-screen area 290 of the sub-screen 230 corresponds to the second backlight area 390 in FIG. 3. The main screen 210 corresponds to the first backlight area 370. The processor 110 adjusts the second brightness matrix to correspond to the second backlight area 390, and the processor 110 adjusts the first brightness matrix to correspond to the first backlight area 390. The processor 110 merges the adjusted first brightness matrix with the second brightness matrix to generate the backlight brightness matrix required by the combined image frame for the display screen.

In operation S760, the brightness backlight matrix is output to the backlight units correspondingly. In some embodiments, the operation S760 is performed by the processor 110 in FIG. 1. In some embodiments, according to the merged backlight brightness matrix input in operation S750, the backlight units are controlled to generate the brightness required for displaying the image frame in the operation S760. In some embodiments, the processor 110 maps the backlight brightness matrix of the image frame to the respective positions of the backlight units in the backlight areas, and the processor 110 controls each backlight unit to generate the required brightness respectively for displaying the image frame. In some embodiments, the processor 110 respectively controls the dimming modes of the backlight units, such as PWM or direct current signal dimming mode, in the backlight areas corresponding to the screen areas of the image frame, which is based on the respective display settings for the screen areas, and the processor 110 generates the corresponding dimming control signals to respectively control the backlight units to emit light with required brightness.

In operation S770, the next image frame of the display screen is processed. In some embodiments, the operation S770 include that the processor 110 cyclically executes operations S720 to S760 to process the next image frame based on the image frames input by each signal source, and the processor 110 continuously generates the image frame to be displayed on the display screen and controls the backlight units to generate the brightness required by each image frame on the display screen.

In the embodiments of the present disclosure, the operations of the backlight control signal generating process 700 are not limited to the above-mentioned sequence, and the operations of the backlight control signal generating process 700 can be replaced by each other or changed in order to generate equivalent results. For example, after the image frames to be displayed in the screen areas are received in the operation S720, the operation S740 can be executed next to determine the respective position of each screen area on the next image frame of the display screen, and the received image frames to be displayed are merged to generate the next image frame of the display screen. The operation S730 or S750 is executed next to the S740 to process the next image frame of the display screen and generate the corresponding backlight brightness matrix, which does not affect the implementations of the present disclosure.

Reference is made to FIG. 1 again. In some embodiments, the display panel 140 is an LCD panel. In some embodiments, the LED backlight unit 160 of the backlight module 190 is an LED backlight unit. Correspondingly, the LED backlight unit 160 can be divided into a plurality of LED backlight areas to illuminate the a plurality of display areas of the display panel 140 respectively.

Figure 8:
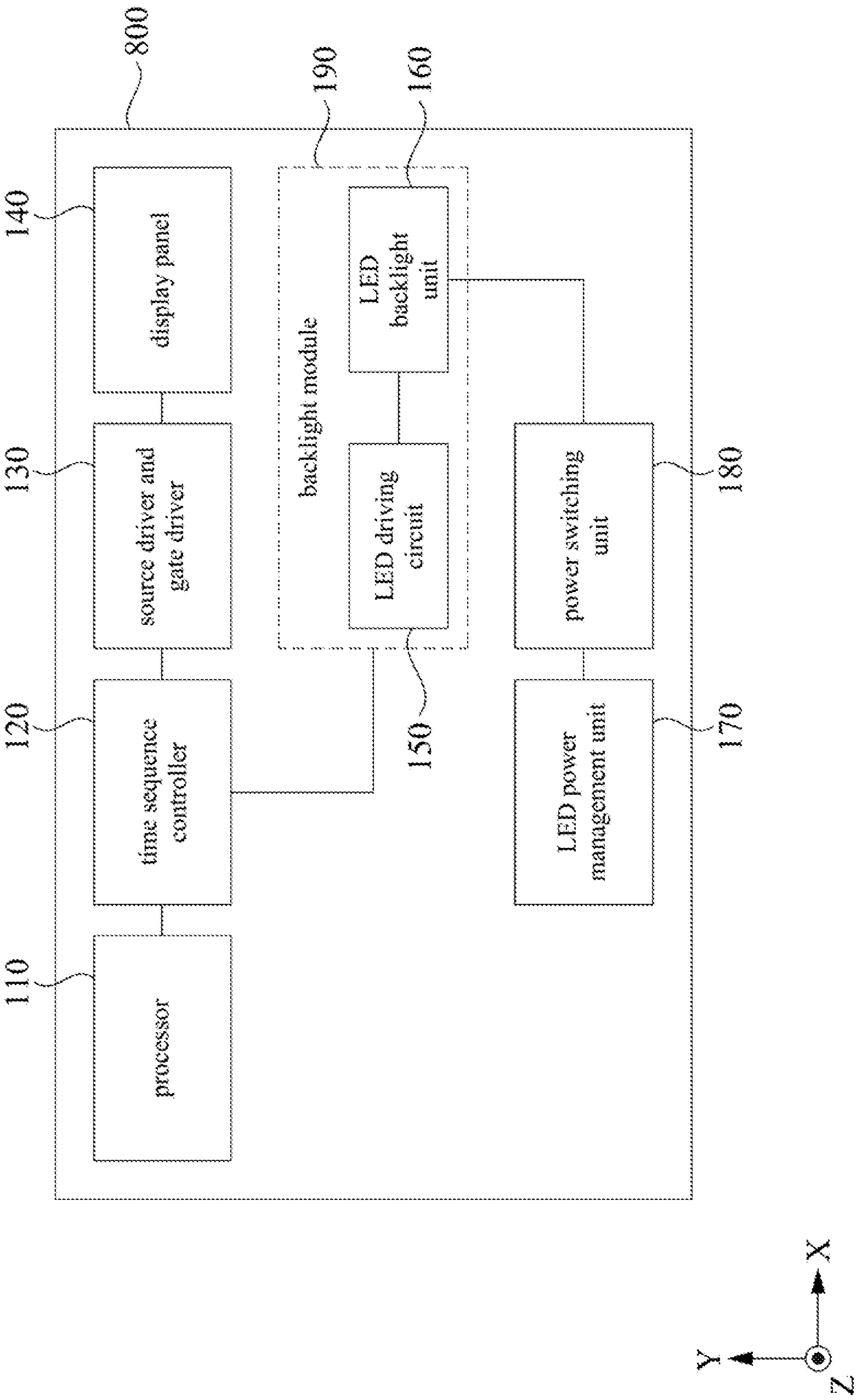
FIG. 8 is a schematic diagram of another display device according to some embodiments of the present disclosure.

Reference is made to FIG. 8. FIG. 8 is a schematic diagram of another display device 800 according to some embodiments of the present disclosure. In some embodiments, the display device 800 further includes a time sequence controller 120, a source driver and a gate driver 130, an LED power management unit 170 and a power switching unit 180. The backlight module 190 includes a LED driving circuit 150 and a LED backlight unit 160.

The processor 110 is coupled to the time sequence controller 120, and the processor 110 outputs the data of image frames to the time sequence controller 120. The time sequence controller 120 is coupled to the processor 110, the source and gate drivers 130 and the LED driving circuit 150. The time sequence controller 120 outputs timing control signals to the source driver and gate driver 130. The time sequence controller 120 converts the brightness data corresponding to each display areas of the display panel 140 into dimming data, which is transmitted to the LED driving circuit 150 correspondingly. The display panel 140 is coupled to the source driver and the gate driver 130 and is driven by the source driver and the gate driver 130 to display the image frame on the display screen.

The LED driving circuit 150 is coupled to the time sequence controller 120 and the LED backlight unit 160. In some embodiments, the LED driving circuit 150 includes two registers inside. The first register, which may be referred to as a receiving stage register, receives the dimming data of the next image frame. When the update flag is triggered, the dimming data of the next frame temporarily stored in the first register is transferred to the second register, which may be referred to as the output stage register. The LED driving circuit 150 can use the dimming data of the next frame temporarily stored in the second register to control the respective currents to the LEDs in the backlight areas corresponding to the display areas of the LCD.

The LED backlight unit 160 is coupled to the LED driving circuit 150. The LED backlight unit 160 is driven by the LED driving circuit 150 to provide backlight brightness to the display panel 140. In addition, the LED backlight unit 160 can feed back the currents received by the LEDs to the LED driving circuit 150, so the current feedback control can be performed.

In summary, the embodiments of the present disclosure provide a display device. First, by judging the operation mode of the sub-screen, when the sub-screen enters idle mode, the sub-screen is shrink and the brightness of the backlight unit is reduced within the sub-screen to improve the utilization of the main screen. Second, when there is a message notification on the sub-screen, the screen is enlarged, the brightness of the backlight unit within the sub-screen is increased, and the blinking mode is entered to actively remind the user. Third, according to the different applications of the user in the PIP, the appropriate backlight settings (such as direct current dimming, PWM dimming) can be turned on through the display to give the user a better visual experience.

Various functional elements have been disclosed herein. For those of ordinary skill in the art, functional elements, modules can be implemented by circuits (whether dedicated circuits, general-purpose circuits or under the control of one or more processors and coded instructions). For example, the backlight module can be implemented as a backlight circuit.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the disclosure. Therefore, the spirit and scope of the appended claims should not be limited to the description of the embodiments contained herein.

What is claimed is:

1. A display device, comprising:

a display panel, configured to display a display screen;

a backlight module, configured to provide a backlight brightness to the display panel, wherein the backlight module includes backlight units; and a processor, coupled to the display panel and the backlight module, configured to generate the display screen and to determine the backlight brightness corresponding to the display screen;

wherein the processor receives or generates a plurality of image contents according to a continuous image signal, the processor generates a first display area and a second display area on the display screen displaying the plurality of image contents respectively based on a display setting, the processor dynamically adjusts a size and a position of the first display area and the second display area on the display screen based on an instant state of the continuous image signal respectively;

wherein the processor determines a first backlight area within the backlight module corresponding to the first display area and a second backlight area within the backlight module corresponding to the second display area, and the processor generates a plurality of backlight control signals corresponding to the first backlight area and the second backlight area based on the display setting and the plurality of image contents;

wherein the processor determines the first backlight area as a first dimming mode or a second dimming mode according to the display setting, and the processor determines the second backlight area as the first dimming mode or the second dimming mode according to the display setting;

wherein the processor generates the plurality of backlight control signals corresponding to the first dimming mode or the second dimming mode to control at least one of the backlight units in the first backlight area and the second backlight area respectively;

wherein the processor determines whether a first color histogram and a second color histogram are the same or similar within a time interval according to a continuous image of one of the plurality of image contents, so as to determine an operation state of one of the plurality of image contents;

wherein the processor is further configured to determine a color value difference between the first color histogram and the second color histogram, and to determine whether the color value difference is greater than a threshold, so as to determine the operation state of one of the plurality of image contents.

2. The display device of claim 1, wherein when the operation state of one of the plurality of image contents is an idle state, the processor is further configured to shrink or hide the first display area or the second display area, and to control the first backlight area corresponding to the first display area or the second backlight area corresponding to the second display area to decrease brightness.

3. The display device of claim 1, wherein when the operation state of one of the plurality of image contents is a reminding state, the processor is further configured to enlarge the first display area or the second display area, and to control the first backlight area corresponding to the first display area or the second backlight area corresponding to the second display area to increase brightness or to flicker.

4. The display device of claim 1, wherein when the color value difference is not greater than the threshold, the processor is further configured to determine the operation state to be an idle state.

5. The display device of claim 1, wherein when the color value difference is greater than the threshold and a previous operation state of one of the plurality of image contents is an idle state, the processor is further configured to determine the operation state is a reminding state.

6. The display device of claim 1, wherein the display setting comprises a plurality of display function settings corresponding to the first display area and the second display area, the processor generates the plurality of backlight control signals to control the first backlight area and the second backlight area and switch the first backlight area or the second backlight area to the first dimming mode or the second dimming mode based on the plurality of display function settings corresponding to the first display area and the second display area and the plurality of image contents.

7. The display device of claim 1, wherein the processor is further configured to enlarge, shrink or hide the first display area or the second display area, and to control the first backlight area corresponding to the first display area or the second backlight area corresponding to the second display area to increase brightness, to decrease brightness or to flicker.

8. A display device, comprising:

a display panel, configured to display a display screen;

a backlight module, configured to provide a backlight brightness to the display panel, wherein the backlight module includes backlight units, and the backlight units respectively receive one of a plurality of backlight control signals to generate brightness; and a processor, coupled to the display panel and the backlight module, and configured to generate the display screen and to determine the backlight brightness corresponding to the display screen;

wherein the processor is further configured to dynamically generate a first display area and a second display area of the display screen according to a display setting, and to determine a first backlight area within the backlight module corresponding to the first display area and a second backlight area within the backlight module corresponding to the second display area, the first display area and the second display area display one of a plurality of image content respectively, wherein the plurality of image contents are different;

wherein the processor is further configured to dynamically adjust a size and a position of the first display area, the second display area, the first backlight area and the second backlight area based on an instant state of a continuous image signal, and to generate a plurality of backlight control signals corresponding to the first backlight area and the second backlight area, wherein according to a plurality of display function settings corresponding to the first display area and the second display area, the plurality of backlight control signals control the first backlight area or the second backlight area to switch to at least a first dimming mode or a second dimming mode according to the display setting;

wherein the processor generates the plurality of backlight control signals corresponding to at least the first dimming mode or the second dimming mode to control at least one of the backlight units in the first backlight area and the second backlight area respectively;

wherein the processor generates a plurality of brightness matrixes according to the first display area and the second display area and the plurality of image content, the processor merges the plurality of brightness matrixes to generate a main brightness matrix corresponding to the display screen, and the processor controls the backlight module according to the main brightness matrix to provide the backlight brightness.

9. The display device of claim 8, wherein the first dimming mode is one of a direct current dimming mode and a PWM dimming mode, wherein the second dimming mode is the other of the direct current dimming mode and the PWM dimming mode.

10. The display device of claim 8, wherein when a first display function setting of the first display area turns on a MPRT function, the processor is further configured to control the dimming mode of the first backlight area corresponding to the first display area to be a PWM dimming mode.

11. The display device of claim 10, wherein when a second display function setting of the second display area does not turn on the MPRT function, the processor is further configured to control the dimming mode of the second backlight area corresponding to the second display area to be a direct current dimming mode.

12. A display device, comprising:

a display panel, configured to display a display screen;

a backlight module, configured to provide a backlight brightness to the display panel, wherein the backlight module includes backlight units; and a processor, coupled to the display panel and the backlight module, and the processor is configured to generate the display screen and to determine the backlight brightness corresponding to the display screen;

wherein the processor is further configured to receive a continuous image signal, and to instantly determine an instant state of the continuous image signal, the processor determines an operation state of the continuous image signal according to the instant state of the continuous image signal, when the operation state is not an idle state, the processor dynamically generates a display area on the display screen to display a first image content of the continuous image signal and adjusts a size and a position of the display area based on the instant state of the continuous image signal, the processor determines a backlight area of the backlight module corresponding to the display area according to the display area, and the processor generates a backlight control signal corresponding to the backlight area according to the first image content;

wherein the processor determines the backlight area as a first dimming mode or a second dimming mode according to a display setting;

wherein the processor generates the backlight control signal corresponding to the first dimming mode or the second dimming mode to control at least one of the backlight units in the backlight area;

wherein the continuous image signal includes a first image frame and a second image frame, and the first image frame and the second image frame are two consecutive image frames, and the processor determines the instant state and thereby the operation state of the continuous image signal according to the first image frame and the second image frame.

13. The display device of claim 12, wherein the processor generates a first color histogram and a second color histogram according to the continuous image signal in a time interval, and the processor determines the operation state of the continuous image signal according to whether the first color histogram and the second color histogram are the same or similar.

14. The display device of claim 13, wherein the processor is further configured to calculate a color value difference between the first color histogram and the second color histogram, and the processor determines whether the color value difference is larger than a threshold, so as to determine the operation state of the continuous image signal.

15. The display device of claim 14, wherein when the color value difference is not greater than the threshold, the processor is further configured to determine the operation state to be the idle state.

16. The display device of claim 12, wherein when the operation state of the continuous image signal is the idle state, the processor shrinks or hides the display area in the display screen.

17. The display device of claim 12, wherein when the operation state of the continuous image signal is the idle state, the processor generates the backlight control signal to decrease the backlight brightness.

* * * * *